US008958780B2

(12) United States Patent
Smith et al.

(10) Patent No.: US 8,958,780 B2
(45) Date of Patent: Feb. 17, 2015

(54) PROVISIONING BASED ON APPLICATION AND DEVICE CAPABILITY

(75) Inventors: Christopher David Smith, Burlington (CA); Thomas Owen Parry, Cambridge (CA); Jason Lee Carter, Davie, FL (US); David Clarke, Redmond, WA (US); Salim Hayder Omar, Waterloo (CA); Axel Ferrazzini, Uccle (BE); Nicholas Patrick Alfano, Stratford-Upon-Avon (GB)

(73) Assignee: BlackBerry Limited, Waterloo, Ontario (CA)

( * ) Notice: Subject to any disclaimer, the term of this patent is extended or adjusted under 35 U.S.C. 154(b) by 169 days.

(21) Appl. No.: 12/900,263

(22) Filed: Oct. 7, 2010

(65) Prior Publication Data

US 2012/0088540 A1  Apr. 12, 2012

(51) Int. Cl.
*H04M 1/66* (2006.01)
*H04L 29/06* (2006.01)
*H04W 8/24* (2009.01)
*H04L 29/08* (2006.01)
*H04W 4/00* (2009.01)

(52) U.S. Cl.
CPC ............... *H04W 8/24* (2013.01); *H04L 67/303* (2013.01); *H04W 4/001* (2013.01)
USPC ....................... 455/414.3; 455/550.1; 455/411

(58) Field of Classification Search
USPC ...................................................... 455/550.1
See application file for complete search history.

(56) References Cited

U.S. PATENT DOCUMENTS

| 7,035,630 | B2 | 4/2006 | Knowles |
| 7,206,593 | B1 * | 4/2007 | Yarkosky et al. ............. 455/517 |
| 7,630,714 | B2 | 12/2009 | Clark et al. |
| 7,873,722 | B2 * | 1/2011 | Paul et al. ..................... 709/223 |

(Continued)

FOREIGN PATENT DOCUMENTS

| IL | WO-2010/000549 A2 * | 1/2010 |
| WO | 2008012659 A2 | 1/2008 |

OTHER PUBLICATIONS

Open Mobile Alliance; SCOMO Architecture; Candidate Version 1.0; OMA-AD-SCOMO-V1_0-20081024-C; Oct. 24, 2008; 14 pages.

(Continued)

*Primary Examiner* — William Nealon
(74) *Attorney, Agent, or Firm* — Conley Rose, P.C.; J. Robert Brown, Jr.

(57) ABSTRACT

A user equipment (UE) is disclosed comprising an agent configured to monitor and report UE configuration and capability information, wherein the UE is further configured to provide the UE configuration and capability information, and subsequently receive an application based on the configuration and capability information. Also disclosed is a network comprising a provisioning server configured to receive UE configuration and capability information, and subsequently provide an application based on the UE configuration and capability information. Also disclosed is a method comprising providing UE configuration and capability information from a UE, and receiving an application at the UE based on the configuration and capability information. Also disclosed is a method comprising receiving UE configuration and capability information at a provisioning server, and providing an application from the provisioning server based on the UE configuration and capability information.

31 Claims, 4 Drawing Sheets

(56) References Cited

U.S. PATENT DOCUMENTS

| | | | |
|---|---|---|---|
| 8,078,158 B2* | 12/2011 | Backholm | 455/419 |
| 2006/0030315 A1* | 2/2006 | Smith et al. | 455/432.3 |
| 2006/0039561 A1 | 2/2006 | Ypya et al. | |
| 2006/0106806 A1* | 5/2006 | Sperling et al. | 707/10 |
| 2007/0093243 A1* | 4/2007 | Kapadekar et al. | 455/419 |
| 2009/0247124 A1* | 10/2009 | de Atley et al. | 455/410 |
| 2009/0325565 A1* | 12/2009 | Backholm | 455/419 |
| 2010/0167696 A1* | 7/2010 | Smith et al. | 455/411 |
| 2010/0262958 A1* | 10/2010 | Clinton et al. | 717/171 |
| 2011/0087763 A1 | 4/2011 | George | |
| 2011/0113090 A1* | 5/2011 | Peeri | 709/203 |

OTHER PUBLICATIONS

Open Mobile Alliance; Software Component Management Object Requirements; Candidate Version 1.0; OMA-RD-SCOMO-V1_0-20090519-C; May 19, 2009; 22 pages.

Open Mobile Alliance; Software Component Management Object; Candidate Version 1.0; OMA-TS-DM-SCOMO-V1_0-20100401-C; Apr. 1, 2010; 50 pages.

Bellavista, Paolo, et al.; "The Ubiquitous Provisioning of Internet Services to Portable Devices," Pervasive Computing; IEEE; Jul.-Sep. 2002; 7 pages.

Canadian Office Action; Application No. 2,752,883; May 21, 2013; 2 pages.

Canadian Office Action; Application No. 2,752,883; Jul. 30, 2014; 3 pages.

European Extended Search Report; Application No. 10187799.1; Jun. 30, 2014; 9 pages.

Open Mobile Alliance; OMA Device Management Standardized Objects; Draft Version 2.0; OMA-TS-DM_StdObj_0-20100609-D; Jun. 9, 2010; 26 pages.

* cited by examiner

PROVISIONING BASED ON APPLICATION AND DEVICE CAPABILITY

BACKGROUND

As used herein, the terms "user equipment" and "UE" may in some cases generally refer to mobile devices such as mobile telephones, mobile devices, personal digital assistants, handheld, laptop computers, tablet computers, and similar devices that have telecommunications capabilities. Such a UE may comprise a UE and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE may comprise the device itself without such a module. In other cases, the term "UE" may refer to devices that have similar capabilities but that are not transportable, such as desktop computers, set-top boxes, or network appliances. The term "UE" can also refer to any hardware or software component that can terminate a communications session for a user. Also, the terms "user equipment," "UE," "user agent," "UA," "user device" and "user node" might be used interchangeably herein.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
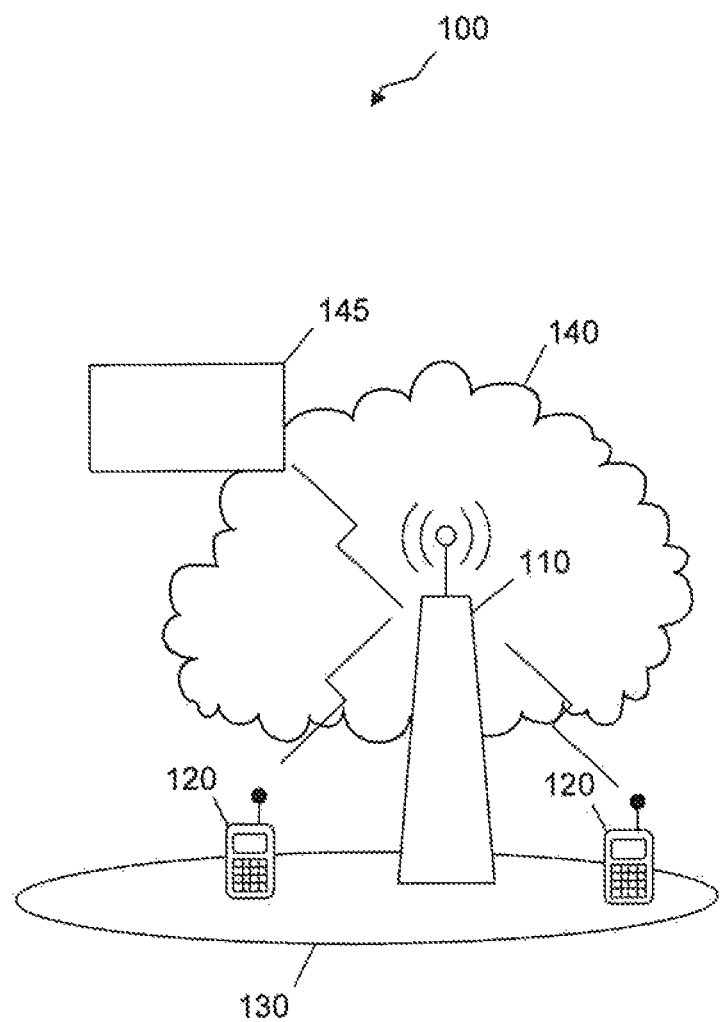
FIG. 1 is a schematic diagram of a communications system that allows a UE to communicate with at least one of other network components and devices according to an embodiment of the disclosure.

It should be understood at the outset that although illustrative implementations of one or more embodiments of the present disclosure are provided below, the disclosed systems and methods may be implemented using any number of techniques, whether currently known or in existence. The disclosure should in no way be limited to the illustrative implementations, drawings, and techniques illustrated below, including the example designs and implementations illustrated and described herein, but may be modified within the scope of the appended claims along with their full scope of equivalents.

A successful provisioning of new applications, application updates, or both to existing applications on a UE (e.g. mobile device) may be based on, for example but not limited to, the UE's capability and configuration information. The UE's capability and configuration information may include the version of a firmware or system software (e.g. operating system) on the UE, available application programming interfaces (APIs) or libraries on the UE, or both. Additionally or alternatively, the UE's capability and configuration information may include the UE's hardware and hardware configuration, for example the amount of available random access memory (RAM), security authorizations on the UE, or both. Typically, the provisioning of new applications or application updates may be managed or handled by a provisioning server in communications with the UE. The term application is used further herein to describe a new (e.g. downloaded) application or an application update for the UE or both applications and updates. Specifically, provisioning application(s) on the UE may refer to provisioning new application(s) or updates to existing application(s) on the UE, such as software, programs, drivers, or services.

Disclosed herein are methods, devices, and systems for allowing a UE to manage and handle the provisioning of applications and communicate with a provisioning server. The UE may comprise an Application and Capability Discovery Agent (ACDA) that may be configured to monitor and report the UE's capability and configuration information to one or a plurality of provisioning servers, such as for different services. The ACDA may be a software agent or instruction code executed by a processor to implement the various provisioning schemes described below. The ACDA may maintain the capability and configuration information on the UE and report any changes in the maintained information to the communication server(s). The ACDA is also referred to herein as an Application, Service, or both Application and Service (NS) Discovery Agent. The capability and configuration information may be associated with different software aspects, hardware aspects, or both software and hardware aspects of the UE. For example, the capability and configuration information may comprise any combination of the UE's operating system (OS) version, device drivers, details about the hardware components, device communications, other capabilities, device access plan, available device services provided by a carrier, current applications, or other device information.

The ACDA may collect the capability and configuration information in a plurality of reports, for example Service Class Maps, and send the reports or descriptors to the provisioning server(s). The capability and configuration information may be stored in a management object, such as in an OMA DM (Open Mobile Alliance Device Management) object embedded in a tree structure stored on the UE or on one or more servers. The provisioning server(s) may then analyze the information in the reports to select or provision new applications, application updates, or both to existing applications for the UE, such as prior to downloading an application or application update to the UE. The provisioning server(s) may also maintain a database about the UE's capability and configuration information. Using the ACDA on the UE to handle at least some of the provisioning of applications may provide the provisioning servers 145 with more capability and configuration information about the UE. Further, the provided information may be more regularly updated and shared between multiple provisioning servers. As such, the provisioning servers may have improved capability and configuration information to provision applications for the UE before actually downloading the provisioned application for the UE, which may be more efficient and reduce or prevent application failures on the UE.

FIG. 1 illustrates an embodiment of a radio access network (RAN) 100, which may comprise a long-term evolution (LTE) or LTE-Advanced (LTE-A), as described in the Third Generation Partnership Project (3GPP), or other existing or after developed networks. In this example, an LTE or LTE-A system may include an Evolved Universal Terrestrial Radio Access Network (E-UTRAN) node B (or eNB), a wireless access point, or a similar component rather than a traditional base station. FIG. 1 is an example and may have other components or arrangements in other embodiments. In an embodiment, the RAN 100 may comprise at least one access device 110 and at least one UE 120, both of which may be located within a cell 130. The RAN 100 may also comprise or may be coupled to a network 140 and at least one provisioning server 145.

As used herein, the term "access device" generally refers to any component of the wireless network, such as a traditional base station, a wireless access point, or an LTE or LTE-A node B or eNB, that creates a geographical area of reception and transmission coverage allowing a UE 120 or a relay node (not shown) to access or communicate with other components in a telecommunications system, such as a second UE 120. In this document, the term "access node" and "access device" may be used interchangeably, but it is understood that an access node may comprise a plurality of hardware and software components.

The access device 110 may communicate with any UE 120 within the same cell 130, directly via a direct link, such as in a UTRAN. The cell 130 may be a geographical area of reception and transmission coverage. For instance, the direct link may be a point-to-point link established between the access device 110 and the UE 120 and used to transmit and receive signals between the two. Alternatively, the access devices 110 may communicate with any UE 120 in the same cell 130 over shared links, such as in an E-UTRAN. For instance, the shared links may comprise an uplink shared channel and a downlink shared channel. Additionally, the access device(s) 110 may communicate with other components or devices to provide for the components of the RAN 100 access to any other network 140, for instance using similar or different network protocols or technologies. In an embodiment, the UEs 120 may move about between different cells 130 and their communications may be handed-over between the different cells 130, where the UEs 120 may communicate with different access devices 110.

The access device 110 may also allow the UEs 120 to communicate with at least one provisioning server 145, which may be located at or coupled to the network 140. The network 140 may comprise a wireless network, a wired network, or a combination of any wired or wireless networks. The networks may include any combination of a Wireless LAN (WLAN) network, an Ethernet based network, an Internet Protocol (IP) based network, a Digital Subscriber Line (DSL) network, an Optical communications network, or any other wireless or wired networks that may be used to exchange communications/data with the UE 120.

The provisioning server(s) 145 may comprise any component(s), system(s), or device(s) configured to select and provide application to the UE 120. Some of the application servers 145 may also provision or select available or supported services for the UE 120, such as email or data services. For instance, the provisioning server 145 may comprise an authority server that manages at least some of the communications of the UE 120, such as a Blackberry Enterprise Server (BES) or other systems that promote applications or services access. Other provisioning servers 145 may include an operation, management, and administration (OMA) device management server, which may be owned by a carrier, any server owned by a third party application provider, such as a mobile game vendor, or both. The provisioning server 145 may provision or select the application for the UE 120 based on the capabilities and configurations of the UE 120 that are associated with the UE's software elements, hardware elements, or both.

Specifically, the provisioning of application may be based on the capabilities and configurations that are monitored and reported to the provisioning server(s) 145 by the UE 120. The UE 120 may comprise an ACDA that is configured to monitor and report the UE's configuration and capability information to the provisioning server(s) 145. The ACDA may comprise a software agent that may run on the UE 120 to obtain the configuration and capability information, which may be associated with different software elements, hardware elements, or both software and hardware element of the UE 120. In some embodiments, the ACDA may maintain the capability and configuration information on the UE, for example in one or a plurality of reports, files, tables, lists, databases, or combinations thereof. For instance, the ACDA may monitor the UE and update the maintained capability and configuration information on the UE 120 upon detecting any changes in the UE's hardware, software, or both.

The configuration and capability information may comprise the UE's operating system (OS) version, firmware information, such as device drivers, hardware details, or both. The hardware details may comprise the UE's available communications transport technologies (e.g. 3G, EDGE, General Packet Radio Service (GPRS), WiFi, WiMAX, tethered Universal Serial Bus (USB), or other technologies). The configuration and capability information may also comprise the UE's available services that are provided by a carrier, such as support for new protocols (e.g. session initiation protocol (SIP)), extensions to existing services, such as larger email mailbox or larger email attachments, or both. The configuration and capability information may also comprise any installed software, which may include libraries, applications, a change to the user's billing plan, such as free unlimited data access for evenings and weekends, a change to the user's access rights, such as a BES policy change to allow the user to access social networking sites out of work hours, or combinations thereof. Additionally or alternatively, the configuration and capability information may comprise any other information that may be related to the loading or operating of new software on the UE 120.

In an embodiment, the ACDA may obtain or update the current configuration and capability information on the UE 120, for instance as scheduled or indicated by the user of the UE 120, any of the provisioning servers 145, or an operator of the RAN 100. The ACDA at the UE 120 may format or combine the configuration and capability information into a plurality of reports that may be associated with the different provisioning servers 145. For instance, the reports may comprise a plurality of Service Class Maps for different provisioning servers 145 or different applications, services, or classes. In some embodiments, the reports may comprise a plurality of standardized file types, such as Extensible Markup Language (XML) documents. The reports may be forwarded to the corresponding provisioning servers 145, for example as scheduled, upon detecting a change or update in the capability and configuration information, or upon a request from the user of the UE 120 or any of the provisioning servers 145.

For example, upon downloading or updating an application on the UE 120, the ACDA may detect the changes to the capability and configuration information (such as new application or update), update the reports (such as Service Class Maps) accordingly, and send the reports to the provisioning servers 145. The ACDA may send the updated report(s) to one or more provisioning servers 145 or in some cases to a specific provisioning server 145 associated with the application on the UE 120. In another example, a provisioning server 145 may request the maintained report(s) or new reports from the UE 120 before deciding whether to provision or select an application for the UE 120, which may become available at the provisioning server 145. Thus, the UE 120 may send the report(s) to the requesting provisioning server 145 or to all the provisioning servers 145. In yet another example, the report(s) may be sent to the provisioning server(s) 145 upon detecting a request from the user of the UE 120 to download a new application or application update on the UE 120 and before beginning downloading.

The provisioning servers 145 may process the reports from the ACDA to provide or select the application for the UE 120. For instance, a provisioning server 145 may process a received new report from the ACDA that indicates updated or changed capability and configuration information for the UE 120. Thus, the provisioning server 145 may provision or select an application for the UE 120, which may not have been previously selected for the UE 120 before the changes in the capabilities and configurations of the UE 120. The provisioning server 145 may select the application for the UE 120 from a list of available applications available at the provisioning server 145. For example, an addition to the service rights for the UE 120 may be indicated in the report, and accordingly the provisioning server 145 may select a previously unprovisioned service for the UE 120 due to the addition of the new service rights for the UE 120. In some cases, the provisioning server 145 may unselect or unprovision an application of the UE 120 based on the changes in the UE's capabilities and configurations indicated in the received new report. For example, a loss of service rights for the UE 120 may be indicated in the report, and accordingly the provisioning server 145 may unselect a previously provisioned application/update for the UE 120 due to the loss of service rights for the UE 120.

Generating the updated reports at the ACDA may provide current and regularly updated UE capability and configuration information, which may improve the provisioning of applications and reduce the risk of misprovisioning, and thus prevent application failures on the UE 120. Specifically, the provisioning servers 145 may provision (or unprovision) applications, application updates, services, or combinations thereof for the UE 120 based on the updated reports from the ACDA before allowing the UE to download an application or an application update.

In an embodiment, the provisioning servers 145 may maintain a plurality of corresponding lists or a shared list of capability and configuration information, for example in a plurality of databases or a shared database, for each UE 120 or for a large number of UEs. The provisioning servers 145 may maintain in the list(s) the updated capability and configuration information of the UE 120, which may be received in the reports from the ACDA. For instance, when a new report is received, the provisioning servers 145 may update the information in the list and may use the updated information to provision at least one of new applications, application updates, or services, or to unprovision at least one of previously selected applications, updates, or services for the UE 120. Alternatively, when a request for an application is received from the UE 120, the provisioning servers 145 may analyze the list, which may comprise the last updated capability and configuration information received in the last report, to determine whether the requested application or update may be provisioned or granted for the UE 120.

In an embodiment, if an application becomes supported by the UE 120, a provisioning server 145 may perform an unsolicited push of the application to the UE 120. Pushing an unsolicited application on the UE 120 may be more appropriate if the changes to the UE 120 enable a new version or update to an existing application on the UE 120 rather than pushing a completely new application to the UE 120 without the user's knowledge or consent. In one scenario, the provisioning server 145 may update a list of provisioned services/applications for the UE 120 or a plurality of UEs 120 (based on their reported capability and configuration information) and subsequently push the list to the UE 120 or the UEs 120 to inform the UE(s) about the provisioned services/applications or offer to download them.

In another embodiment, if an application becomes supported by the UE 120, for example based on the UE's last reported capability and configuration information, the provisioning server 145 may announce to the user the availability of the new application, for instance via a prompt in a browser (e.g. using a pop-up window) or some other notification (e.g. email). Thus, the user may have a choice to download or ignore the new application. Further, in some embodiments, the ACDA may register or update the capability and configuration information on the UE 120, such as in a Service Class Map or XML document, and retain this information on the UE 120. Subsequently, if the user wishes to download a new application or update an existing application, the Service Class Map or XML document may be sent to the provisioning server 145 to determine whether the UE 120 may support or run the new application or the update.

In an embodiment, the provisioning server 145 may place the UE's identity (UE ID) on a list of UEs for future solicitation that may be related to the supported application, such as a new marketing campaign for the latest upgrade or release of a new mobile game. In one scenario, a plurality of network providers, such as service or application providers, may consult any of the provisioning servers 145 to determine whether any new UEs were provisioned (based on their reported capability and configuration information) for services/applications offered by the network providers. For instance, the network providers may search for UEs in a list associated with the services/applications offered by the network providers, which may be maintained by a provisioning server 145. The network providers may then push a solicitation, for example in an email, to the UEs in the list to inform the UEs about their service/applications or offer to download them. Alternatively, the network providers may search the list for any newly added UEs that were not previously on the list and push a solicitation to the new UEs on the list.

Since the Service Class Maps are created by the ACDA at the UE 120, the provisioning of the application is supported and initially handled at the UE 120. The offloading of at least a portion of the provisioning functions from the provisioning servers 145 to the UE 120 may improve applications and device capability provisioning in the RAN 100. Specifically, using the ACDA to monitor and report the UE's capability and configuration information and to communicate with the provisioning servers 145 prior to allowing the download of an application or application update to the UE 120 may prevent the erroneous installation of software on the UE 120 and the subsequent failure of misprovisioned applications to operate on the UE 120, which will improve user experience and provide other benefits. Maintaining the capability and configuration information of the UE 120 in a shared list or database between the provisioning servers may also prevent the provisioning of applications, services, or updates that may conflict with other applications, services, or updates from the different provisioning servers.

Figure 2:
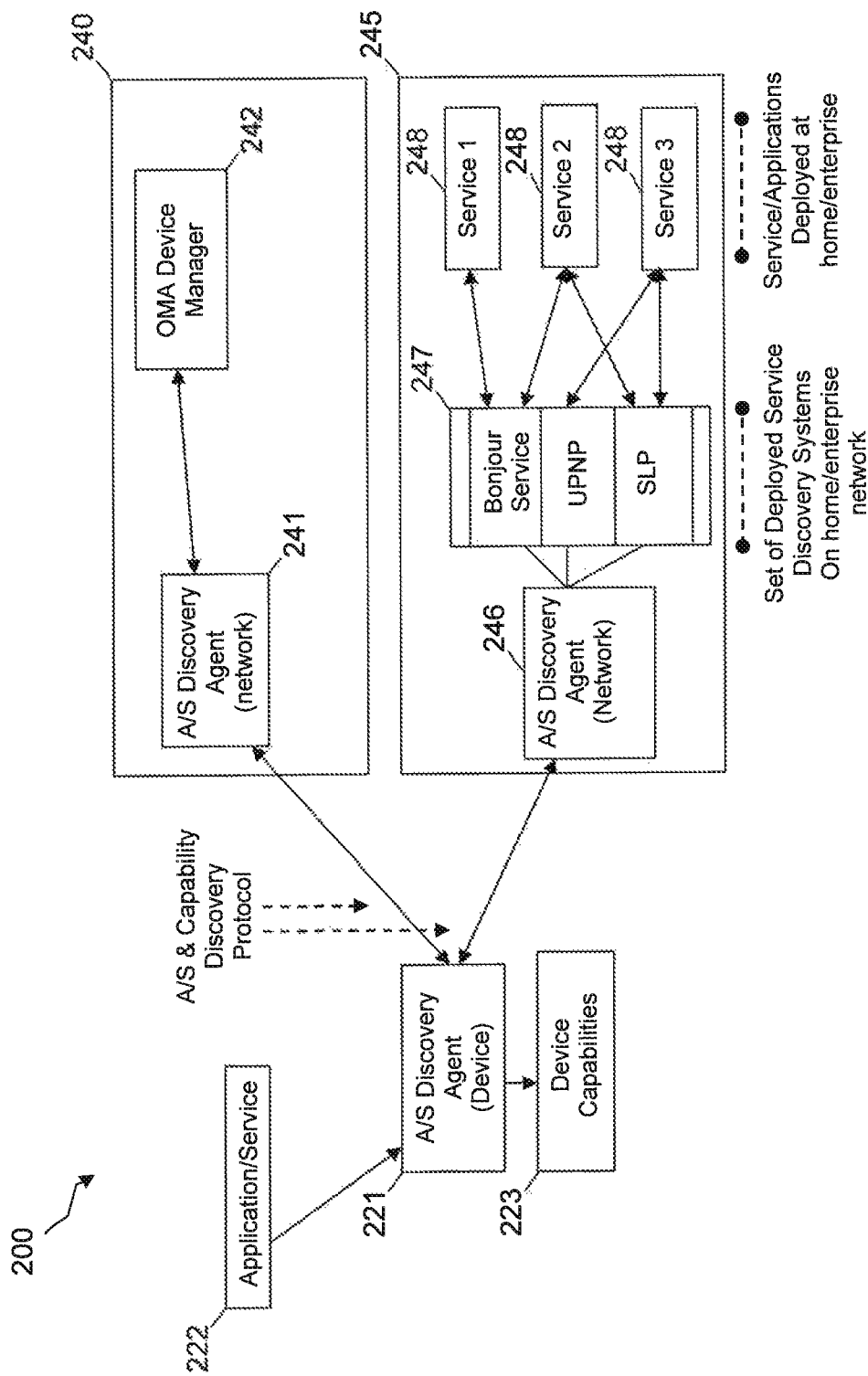
FIG. 2 is a schematic diagram of an application and capability discovery system that allows a UE to monitor and report capability and configuration information to provision applications and application updates on the UE according to an embodiment of the disclosure.

FIG. 2 illustrates an application and capability discovery system 200, wherein the ACDA or A/S Discovery Agent may monitor and report the UE's capabilities and configurations to support the provisioning of application for the UE. In the application and capability discovery system 200, the UE 120 may comprise a first A/S Discovery Agent 221 that may obtain information about at least an available application/service 222 and device capabilities 223 at the UE 120. The first A/S Discovery Agent 221 may add this information to a report (e.g. Service Class Map or XML document) and send it to a first provisioning server 240, a second provisioning server 245, or both, for instance using a protocol that may be used for at least one of application discovery, service discovery, or capability discovery. For example, the information may be sent from the UE 120 to the first provisioning server 240, the second provisioning server, or both via a message, an email, or a SIP signal. The first provisioning server 240 and the second provisioning server 245 may correspond to the provisioning servers 145 and may be located in the same network (e.g. network 140) or different networks that communicate with the UE 120 via the RAN 100.

The first provisioning server 240 may comprise an OMA device management server that comprises a second A/S Discovery Agent 241 and an OMA device manager 240. The second A/S Discovery Agent 241 may communicate with the first A/S Discovery Agent 221 using the application/service and capability discovery protocol and receive the report from the first A/S Discovery Agent 221. The received report for the UE 120 may be maintained in the first provisioning server 240, for example in a database. The OMA device manager 242 may analyze or process the information in the report or the maintained information of the UE 120 (in the database) and accordingly provision or select application for the UE 120. For example, the provisioned applications/updates may be added to a provision list of applications, services, or both applications and services associated with or available to the UE 120.

The second provisioning server 245 may comprise a third A/S Discovery Agent 246 and a set of deployed service discovery systems 247, for example on a home/enterprise network. The third A/S Discovery Agent 246 may receive the report from the first A/S Discovery Agent 221 using the application/service and capability discovery protocol. The set of deployed service discovery systems 247 may represent different connectivity technologies, for example with external networks. The set of deployed service discovery systems 247 may analyze or process the reported UE's capability/configuration information and accordingly provision a plurality of services 248 for the UE 120, which may be deployed at the home/enterprise network. The set of deployed service discovery systems 247 may comprise Service discovery protocols (SDPs), such as Bonjour Service, Universal Plug and Play (UPNP), Service Location Protocol (SLP), other service discovery protocols, or combinations thereof. The set of deployed service discovery systems 247 may select the services 248 (e.g. Service 1, Service 2, Service 3) that may be supported by the UE 120 based on the capability/configuration information sent by the A/S Discovery Agent 221. Similar to the first provisioning server 240, the second provisioning server 245 may maintain the capability/configuration information for each UE 120 and maintain a list of any combination of provisioned applications, application updates, or services for each UE 120.

Figure 3:
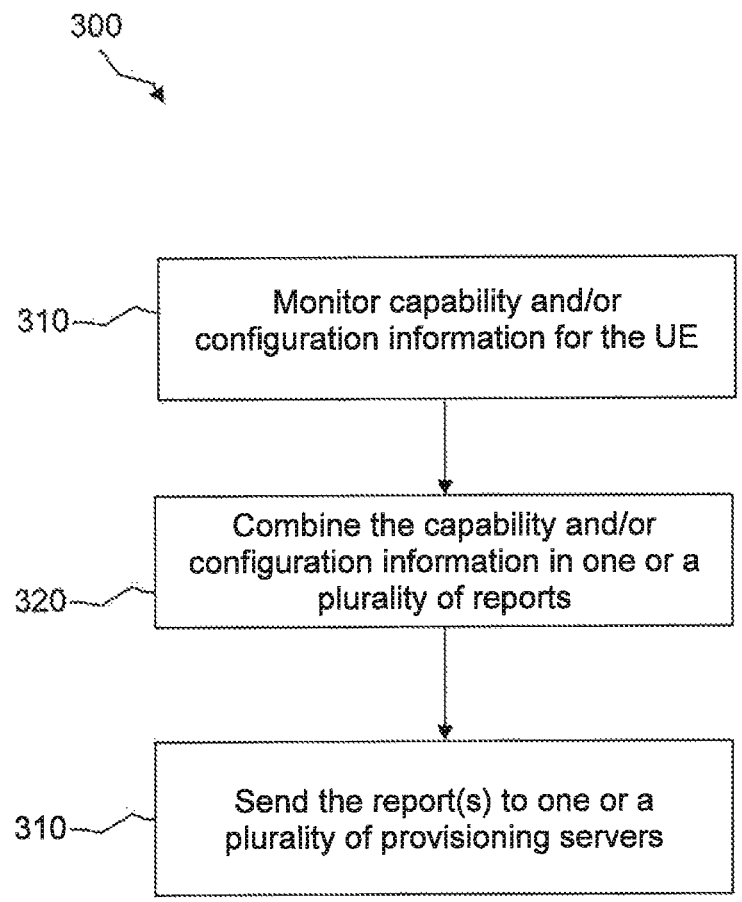
FIG. 3 is a flowchart of an application and capability discovery method for provisioning applications and application updates on a UE according to an embodiment of the disclosure.

FIG. 3 illustrates an embodiment of an application and capability discovery method 300 for handling the provisioning of application at the UE 120. For instance, the application and capability discovery method 300 may be implemented by the ACDA or the first A/S Discovery Agent 221 at the UE 120. At step 310, the ACDA may monitor capability and configuration information for the UE. For instance, the ACDA may obtain information about the applications, services, or applications and services available at the UE 120 and the UE's device capabilities. The application, services, or both may comprise a list of the applications, services, or both applications and services that run on the UE 120 (e.g. firmware, device drivers, OS, APIs, libraries, etc.) and the versions of the applications, services, or both. The device capabilities may comprise hardware information and configuration, such as available RAM, available communications transport for services/protocols provided by a carrier, or both. The device capabilities may also comprise security authorizations, changes to the user's billing plan, changes to the user's access rights, or combinations thereof.

At step 320, the ACDA may combine the capability and configuration information in one or a plurality of reports. For instance, the ACDA may combine the information about at least one of the applications or services available at the UE 120 and the UE's device capabilities in a plurality of Service Class Maps (or AML documents) that may correspond to a plurality of service classes or provisioning servers 145. The ACDA may format the information about the application, services, or both and device capabilities into a report file format according to an application/service and capability discovery protocol that may be used at the provisioning servers 145. At step 330, the ACDA may send the report(s) to one or a plurality of provisioning servers. For instance, the ACDA may send the Service Class Maps to the corresponding provisioning servers, e.g. the first provisioning server 240 and the second provisioning server 245. The ACDA may use the application/service and capability discovery protocol to communicate the Service Class Maps to the provisioning servers. The provisioning servers may also use the application/service and capability discovery protocol to analyze or process the information about the applications, services, device capabilities, or combinations thereof in the received Service Class Maps.

Figure 4:
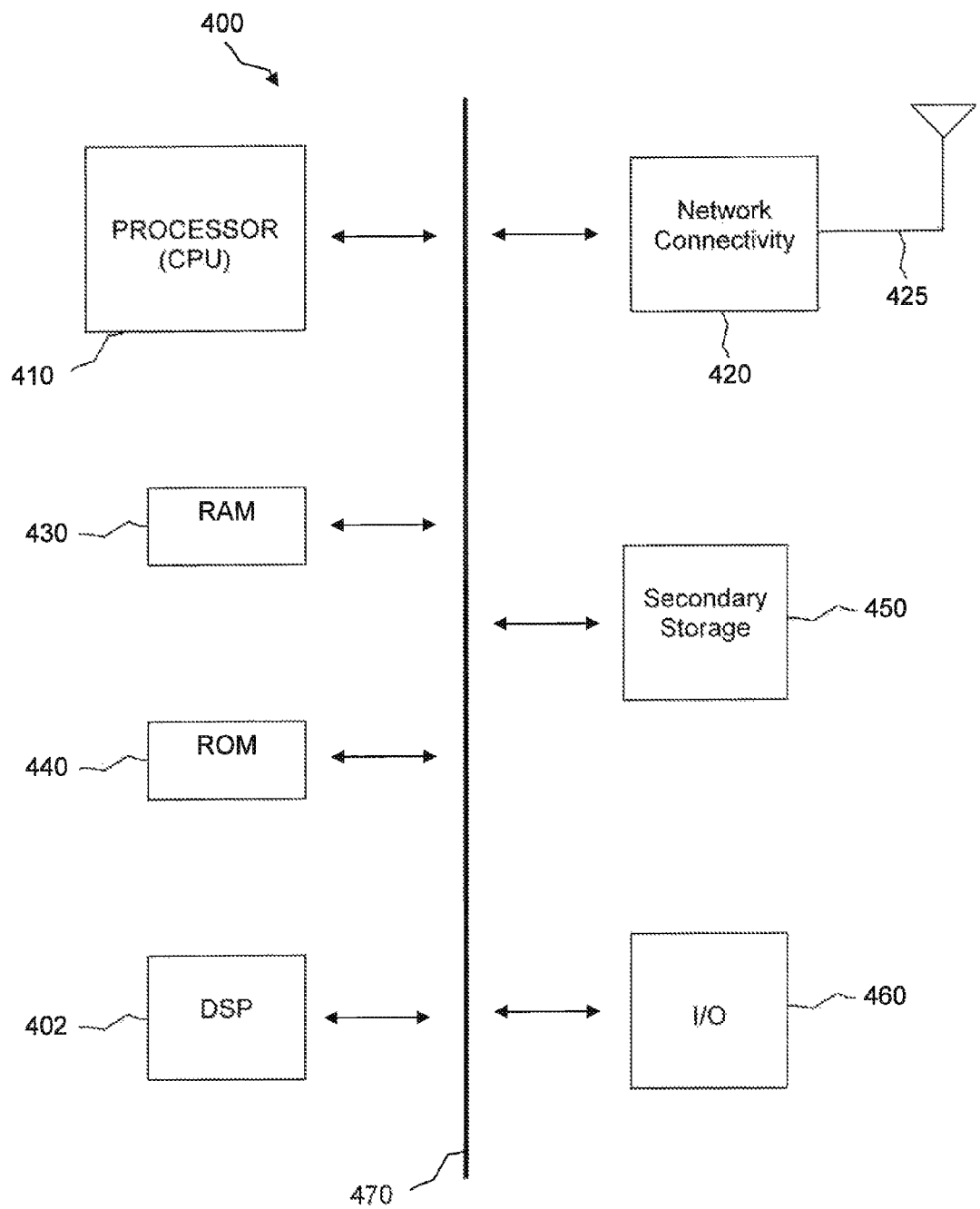
FIG. 4 illustrates a processor and related components suitable for implementing the several embodiments of the present disclosure.

The UE 120 and other components described above might include a processing component that is capable of executing instructions related to the actions described above. FIG. 4 illustrates an example of a system 400 that includes a processing component 410 suitable for implementing one or more embodiments disclosed herein. In addition to the processor 410 (which may be referred to as a central processor unit or CPU), the system 400 might include network connectivity devices 420, random access memory (RAM) 430, read only memory (ROM) 440, secondary storage 450, and input/output (I/O) devices 460. These components might communicate with one another via a bus 470. In some cases, some of these components may not be present or may be combined in various combinations with one another or with other components not shown. These components might be located in a single physical entity or in more than one physical entity. Any actions described herein as being taken by the processor 410 might be taken by the processor 410 alone or by the processor 410 in conjunction with one or more components shown or not shown in the drawing, such as a digital signal processor (DSP) 402. Although the DSP 402 is shown as a separate component, the DSP 402 might be incorporated into the processor 410.

The processor 410 executes instructions, codes, computer programs, or scripts that it might access from the network connectivity devices 420, RAM 430, ROM 440, or secondary storage 450 (which might include various disk-based systems such as hard disk, floppy disk, or optical disk). While only one CPU 410 is shown, multiple processors may be present. Thus, while instructions may be discussed as being executed by a processor, the instructions may be executed concurrently, serially, or otherwise by one or multiple processors. The processor 410 may be implemented as one or more CPU chips.

The network connectivity devices 420 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, Global System for Mobile Communications (GSM) radio transceiver devices, worldwide interoperability for microwave access (WiMAX) devices, other devices for connecting to networks, or combinations thereof. These network connectivity devices 420 may enable the processor 410 to communicate with the Internet or one or more telecommunications networks or other networks from which the processor 410 might receive information or to which the processor 410 might output information. The network connectivity devices 420 might also include one or more transceiver components 425 capable of transmitting, receiving, or both transmitting and receiving data wirelessly.

The RAM 430 might be used to store volatile data and perhaps to store instructions that are executed by the processor 410. The ROM 440 is a non-volatile memory device that typically has a smaller memory capacity than the memory capacity of the secondary storage 450. ROM 440 might be used to store instructions and perhaps data that are read during execution of the instructions. Access to both RAM 430 and ROM 440 is typically faster than to secondary storage 450. The secondary storage 450 is typically comprised of one or more disk drives or tape drives and might be used for non-volatile storage of data or as an over-flow data storage device if RAM 430 is not large enough to hold all working data. Secondary storage 450 may be used to store programs that are loaded into RAM 430 when such programs are selected for execution.

The I/O devices 460 may include liquid crystal displays (LCDs), touch screen displays, keyboards, keypads, switches, dials, mice, track balls, voice recognizers, card readers, paper tape readers, printers, video monitors, or other input devices. Also, the transceiver 425 might be considered to be a component of the I/O devices 460 instead of or in addition to being a component of the network connectivity devices 420.

Various combinations of the components of the system 400, including memory, hardware, firmware, software or others may be referred to herein as a "component".

In an embodiment a UE is provided. The UE may comprise an agent configured to monitor and report UE configuration and capability information, wherein the UE is further configured to provide the UE configuration and capability information, and subsequently receive an application based on the configuration and capability information.

In another embodiment, a network is provided. The network may comprise a provisioning server configured to receive UE configuration and capability information, and subsequently provide an application based on the UE configuration and capability information.

In another embodiment, a method is provided. The method may comprise providing UE configuration and capability information from a UE, and receiving an application at the UE based on the configuration and capability information.

In another embodiment, another method is provided. The method may comprise receiving UE configuration and capability information at a provisioning server, and providing an application from the provisioning server based on the UE configuration and capability information.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user equipment (UE), comprising:
an agent executable by a processor and configured to monitor and send UE configuration and capability information indicating at least one change to the UE,
wherein the UE is configured to subsequently receive an offer to download an application provisioned for the UE based on the UE configuration and capability information, wherein the offer is only received if the application is supported by the UE,
wherein the application was not supported by the UE before the at least one change,
wherein the agent is further configured to send updated UE configuration and capability information, and
wherein at least one service previously provisioned for the UE is subsequently un-provisioned if the updated UE configuration and capability information indicates a loss of service rights for the UE.

2. The UE of claim 1, wherein the UE configuration and capability information is sent in a plurality of reports that comprise a plurality of Service Class Maps.

3. The UE of claim 1, wherein the UE configuration and capability information is sent in a plurality of reports in a plurality of Extensible Markup Language (XML) documents.

4. The UE of claim 1, wherein the UE configuration and capability information comprises software including libraries and applications that are installed on the UE and executable by a processor.

5. The UE of claim 1, wherein the UE configuration and capability information comprises hardware details including the UE's available communications transport.

6. The UE of claim 1, wherein the UE configuration and capability information comprises the UE's operating system (OS) version and firmware information including device drivers.

7. The UE of claim 1, wherein the UE configuration and capability information comprises the UE's available services that are provided by a carrier and extensions to existing services.

8. The UE of claim 1, wherein the UE configuration and capability information comprises changes to the UE's user billing plan changes and access rights.

9. The UE of claim 1, wherein the UE determines to send the UE configuration and capability information on at least one of a periodic basis, a non-periodic basis, or upon a change to the UE configuration and capability information.

10. A network component comprising:
a provisioning server configured to receive user equipment (UE) configuration and capability information indicating at least one change to a UE, and further configured such that upon determining that the at least one change enables the UE to support an application that was not supported by the UE before the at least one change, the provisioning server sends the UE an offer to download the application;
an agent executable by a processor and configured to request the UE configuration and capability information from the UE; and
a plurality of deployed service discovery systems that analyze the UE configuration and capability information and provision accordingly a plurality of services,
wherein the agent is further configured to receive updated UE configuration and capability information from the UE, wherein the plurality of deployed service discovery systems analyze the updated UE configuration and capability information and unprovision at least one of the previously provisioned services if the updated UE configuration and capability information indicates a loss of service rights for the UE.

11. The network component of claim 10, wherein the provisioning server comprises:
an agent executable by a processor and configured to receive the UE configuration and capability information; and
an operation, management, and administration (OMA) device management server that analyzes the UE configuration and capability information and provisions accordingly the application.

12. The network component of claim 10, wherein the provisioning server receives the UE configuration and capability information and provisions the application using a protocol for application discovery, service discovery, capability discovery, or combinations thereof.

13. The network component of claim 10, wherein the UE configuration and capability information is received in a plurality of reports that comprise a plurality of Service Class Maps.

14. The network component of claim 10, wherein the UE configuration and capability information is received in a plurality of reports in a plurality of Extensible Markup Language (XML) documents.

15. The network component of claim 10, wherein the UE configuration and capability information comprises software including libraries and applications that are installed on the UE and executable by a processor.

16. A method comprising:
sending, from an agent on a user equipment (UE), UE configuration and capability information indicating at least one change to the UE; and
receiving, at the UE, an offer to download an application provisioned for the UE based on the UE configuration and capability information, wherein the offer is only received if the application is supported by the UE, and wherein the application was not supported by the UE before the at least one change; and
sending, from the agent, updated UE configuration and capability information, wherein at least on service previously provisioned for the UE is subsequently un-provisioned if the updated UE configuration and capability information indicates a loss of service rights for the UE.

17. The method of claim 16 further comprising:
monitoring the UE configuration and capability information at the UE;
combining the UE configuration and capability information in one or more reports;
sending the one or more reports to provide the UE configuration and capability information to a provisioning server that determines if the application is supported by the UE; and
downloading the application that is provisioned based on the UE configuration and capability information.

18. The method of claim 16 further comprising:
maintaining the UE configuration and capability information on the UE; and
updating the UE configuration and capability information when a new application is downloaded on the UE.

19. The method of claim 16, wherein the UE configuration and capability information is sent upon a user request to download an application on the UE.

20. The method of claim 16, wherein the UE configuration and capability information is sent upon receiving a notification from a provisioning server that decides whether to provision the application for the UE.

21. The method of claim 16, wherein the UE configuration and capability information is sent via a session initiation protocol (SIP) message.

22. The method of claim 16, wherein the UE configuration and capability information comprises software including libraries and applications that are installed on the UE and executable by a processor.

23. The method of claim 16, wherein the UE determines to send the UE configuration and capability information on at least one of a periodic basis, a non-periodic basis, and upon a change to the UE configuration and capability information.

24. A method comprising:
receiving, at a provisioning server, user equipment (UE) configuration and capability information indicating at least one change to a UE;
determining, by the provisioning server, that the at least one change enables the UE to support an application;
sending, from the provisioning server, an offer to download the application on the UE, wherein the application was not capable of properly executing on the UE before the at least one change; and
provisioning the application based on the UE capability and configuration information before sending the application.

25. The method of claim 24 further comprising:
receiving, at the provisioning server, a plurality of reports that comprise the UE configuration and capability information.

26. The method of claim 24 further comprising:
adding the application to a list of provisioned application/updates associated with a UE.

27. The method of claim 24 further comprising:
pushing an unsolicited application update that is provisioned based on the UE configuration and capability information to the UE, wherein pushing the unsolicited application update occurs upon if changes to the UE enable an update to an existing application on the UE.

28. The method of claim 24 further comprising:
announcing, to the UE, a new an application that is provisioned based on the UE configuration and capability information.

29. The method of claim 24 further comprising:
adding a UE identifier (ID) to a list of UE IDs that is associated with an application that is provisioned based on the UE capability and configuration information.

30. The method of claim 24, wherein the UE configuration and capability information comprises software including libraries and applications that are installed on the UE and executable by a processor.

31. The UE of claim 1, wherein the application is one of a new application to be installed on the UE, or an updated version of an existing application on the UE.

* * * * *